(12) United States Patent
Hoellnsteiner et al.

(10) Patent No.: US 10,384,430 B2
(45) Date of Patent: Aug. 20, 2019

(54) METHOD AND DEVICE FOR THE PRODUCTION OF A WATER VAPOR PERMEABLE LAMINAR SHEET

(71) Applicant: SML Maschinengesellschaft m. b. H., Lenzing (AT)

(72) Inventors: Mario Hoellnsteiner, Seewalchen (AT); Johannes Danter, Sankt Georgen im Attergau (AT)

(73) Assignee: SML MASCHINENGESELLSCHAFT M. B. H., Lenzing (AT)

( * ) Notice: Subject to any disclaimer, the term of this patent is extended or adjusted under 35 U.S.C. 154(b) by 219 days.

(21) Appl. No.: 15/197,969

(22) Filed: Jun. 30, 2016

(65) Prior Publication Data

US 2017/0028695 A1    Feb. 2, 2017

(30) Foreign Application Priority Data

Jul. 28, 2015  (DE) .......... 10 2015 009 553
Feb. 25, 2016  (DE) .......... 10 2016 002 152

(51) Int. Cl.
*B32B 37/08* (2006.01)
*B32B 37/00* (2006.01)
(Continued)

(52) U.S. Cl.
CPC .............. *B32B 37/08* (2013.01); *B32B 5/022* (2013.01); *B32B 37/0053* (2013.01);
(Continued)

(58) Field of Classification Search
CPC ... B32B 37/08; B32B 37/1284; B32B 37/153; B32B 2037/1215; B32B 5/022; B32B 37/0053; B32B 37/10; B32B 2307/724
(Continued)

(56) References Cited

U.S. PATENT DOCUMENTS 5,187,005 A * 2/1993 Stahle .................. B32B 5/26
                                                442/208
5,330,595 A   7/1994 Held
(Continued)

FOREIGN PATENT DOCUMENTS

DE  2460432 A1  6/1976
DE  3922028 A1  1/1991
(Continued)

OTHER PUBLICATIONS

European Search Report, dated Dec. 6, 2016, 6 pages.

*Primary Examiner* — Philip C Tucker
*Assistant Examiner* — Vicki Wu
(74) *Attorney, Agent, or Firm* — Lucas & Mercanti, LLP

(57) ABSTRACT

A method and device for producing a water vapor permeable laminar sheet, including the steps of: a) feeding a laminar carrier sheet to a first roll and applying an adhesive onto one side of the carrier sheet at a first location in conveying direction of the carrier sheet, wherein the adhesive is a hot melt adhesive applied in a molten state; b) applying a water vapor permeable molten material onto that side of the carrier sheet provided with the adhesive at a second location in conveying direction located downstream from the first location; c) pressing the composite of carrier sheet, adhesive and water vapor permeable material in a rolling gap formed by the first roll and a second roll which cooperates with the first roll; d) cooling the pressed composite in conveying direction downstream the rolling gap and hauling the composite from the roll arrangement.

6 Claims, 3 Drawing Sheets

(51) Int. Cl.
- *B32B 5/02* (2006.01)
- *B32B 37/10* (2006.01)
- *B32B 37/12* (2006.01)
- *B32B 37/15* (2006.01)

(52) U.S. Cl.
CPC .......... *B32B 37/10* (2013.01); *B32B 37/1284* (2013.01); *B32B 37/153* (2013.01); *B32B 2037/1215* (2013.01); *B32B 2307/724* (2013.01)

(58) Field of Classification Search
USPC .................................................. 156/244.24
See application file for complete search history.

(56) References Cited

U.S. PATENT DOCUMENTS

| | | | | |
|---|---|---|---|---|
| 5,342,469 | A | * | 8/1994 | Bodford ............. A41D 31/02 156/244.22 |
| 6,235,658 | B1 | * | 5/2001 | Panzer ................ B32B 27/12 442/286 |
| 6,677,258 | B2 | * | 1/2004 | Carroll ............ A61F 13/51462 442/394 |
| 8,263,184 | B2 | | 9/2012 | Klingelhage |
| 8,535,786 | B2 | | 9/2013 | Schroeer |
| 8,551,276 | B2 | | 10/2013 | Rothen |
| 10,183,474 | B2 | | 1/2019 | Dandl |
| 2003/0077964 | A1 | * | 4/2003 | Klein ................. B32B 7/12 442/149 |
| 2003/0205314 | A1 | | 11/2003 | Walder |
| 2004/0023588 | A1 | | 2/2004 | Klein |
| 2008/0227353 | A1 | * | 9/2008 | Klingelhage ........... B32B 27/12 442/374 |
| 2011/0271637 | A1 | * | 11/2011 | Wingfield ................ E04B 7/22 52/745.05 |
| 2016/0361894 | A1 | * | 12/2016 | Ciuperca .................. B32B 5/26 |

FOREIGN PATENT DOCUMENTS

| | | |
|---|---|---|
| DE | 4010262 A1 | 10/1991 |
| DE | 4129190 A1 | 3/1993 |
| DE | 4428304 A1 | 2/1996 |
| DE | 19725451 A1 | 12/1998 |
| DE | 19755422 A1 | 6/1999 |
| DE | 19908465 A1 | 9/1999 |
| DE | 10226748 A1 | 1/2004 |
| DE | 102006060954 A1 | 6/2008 |
| DE | 202016001759 U1 | 3/2016 |
| EP | 0522321 B1 | 1/1993 |
| EP | 0947313 A1 | 10/1999 |
| EP | 1207244 A2 | 5/2002 |
| EP | 2051851 B1 | 4/2012 |
| EP | 2868468 A1 | 5/2015 |
| EP | 2913184 A2 | 9/2015 |
| EP | 3031839 A1 | 6/2016 |
| WO | 2005021262 A1 | 3/2005 |
| WO | 2005058599 A1 | 6/2005 |
| WO | 2007133128 A1 | 11/2007 |
| WO | 2015010208 A1 | 1/2015 |

* cited by examiner

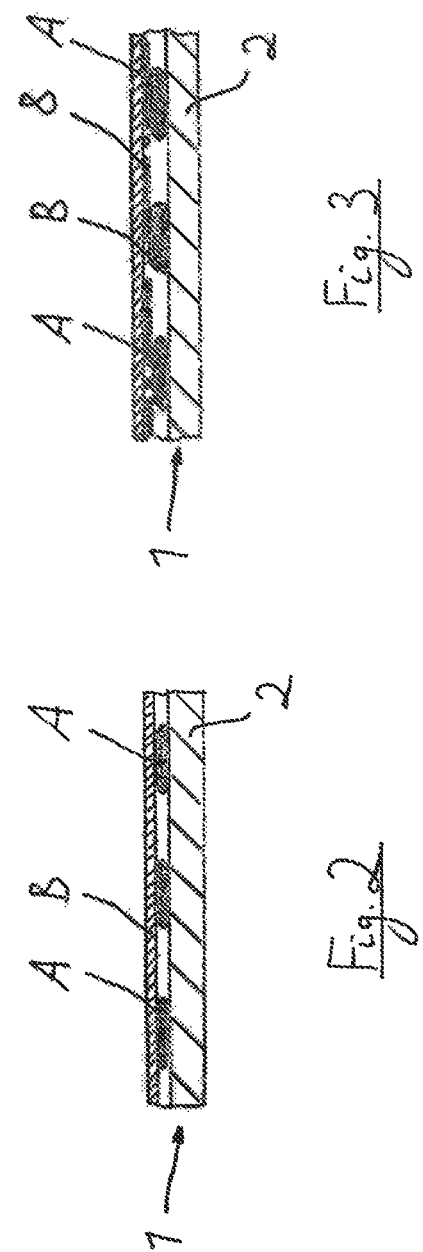

Product Group 1

| | | | | | |
|---|---|---|---|---|---|
| Product 1 | Nonwoven | Hotmelt | *TPE extruded* | Nonwoven | |
| Product 2 | Nonwoven | Hotmelt | *TPE extruded* | Hotmelt | Nonwoven |
| Product 3 | Nonwoven | Reinforcement Grid Hotmelt | | *TPU extruded* | Nonwoven |
| Product 4 | Nonwoven | Reinforcement Grid Hotmelt | | *TPU extruded* | Hotmelt Nonwoven |
| | | | | | |
| Product 5 | Nonwoven | Hotmelt | *TPU extruded* | Nonwoven | |
| Product 6 | Nonwoven | Hotmelt | *TPU extruded* | Hotmelt | Nonwoven |
| Product 7 | Nonwoven | Reinforcement Grid Hotmelt | | *TPU extruded* | Nonwoven |
| Product 8 | Nonwoven | Reinforcement Grid Hotmelt | | *TPU extruded* | Hotmelt Nonwoven |
| | | | | | |
| Product 9 | Nonwoven | Hotmelt | *TPU extruded* | *TPU extruded* | |
| | | | | | |
| Product 10 | Felt | Hotmelt | *TPU extruded* | *TPU extruded* | |
| Product 11 | Felt | Hotmelt | *TPU extruded* | | |

Product Group 2

| | | | | | |
|---|---|---|---|---|---|
| Product 12 | Nonwoven | Hotmelt | *TPU extruded* | | |
| Product 13 | Nonwoven | Hotmelt | *TPU extruded* | Nonwoven | |
| Product 14 | Nonwoven | Hotmelt | *TPU extruded* | Hotmelt | Nonwoven |
| | | | | | |
| Product 15 | Nonwoven | Hotmelt | *TPU extruded* | | |
| Product 16 | Nonwoven | Hotmelt | *TPU extruded* | Nonwoven | |
| Product 17 | Nonwoven | Hotmelt | *TPU extruded* | Hotmelt | Nonwoven |

Product Group 3

| | | | |
|---|---|---|---|
| Product 18 | Nonwoven | Hotmelt | *TPU extruded* |
| Product 19 | Nonwoven | Hotmelt | *TPU extruded* |

Product Group 4

| | | | | | |
|---|---|---|---|---|---|
| Product 20 | Textile Fabric | Hotmelt | *TPU extruded* | | |
| Product 21 | Textile Fabric | Hotmelt | *TPU extruded* | Hotmelt | Textile Fabric |

Bold: Material comming from rolling
Underlined: Material applied with die 6
*Italic:* Material applied with extrusion die 7

Fig. 4

METHOD AND DEVICE FOR THE PRODUCTION OF A WATER VAPOR PERMEABLE LAMINAR SHEET

CROSS-REFERENCE TO RELATED APPLICATIONS

The present application claims priority of DE 10 2015 009 553.6, filed Jul. 28, 2015, and DE 10 2016 002 152.7, filed Feb. 25, 2016, the priority of these applications is hereby claimed and these applications are incorporated herein by reference.

BACKGROUND OF THE INVENTION

The invention relates to a method and a device for the production of a water vapor permeable laminar sheet.

For different applications laminar sheets are required which have permeability with respect to water vapor. Up to now such sheets are produced in several production steps: At first the production of the functional layer takes place, i.e. of a breathable film, on a cast film or blow film line. Subsequently, the laminating of a carrier layer (e. g. non-woven fabric or foil) and of the functional layer takes place by means of adhesive laminating.

Such a method according to the generic kind is known in DE 197 25 451 A1. Here, on a carrier sheet a water vapor permeable layer is applied, wherein it is possible as an option that the carrier sheet is provided with an adhesive at the side facing the water vapor permeable layer.

If the process is operated without an adhesive the laminating of the composite occurs between cooled rolls after the extruded water vapor permeable layer is applied on the carrier sheet.

In the case of using a hotmelt adhesive the same if sprayed or scattered onto the carrier sheet before laminating the composite. The laminating occurs in this case between heated rollers which are heated up to a temperature above the melting point of the hotmelt. Accordingly, in this case at first the water vapor permeable layer is extruded and cooled down before it is laminated subsequently with the carrier sheet in a hot roller mill, wherein the carrier sheet is prepared with the hotmelt adhesive at that side which faces the water vapor permeable film. The adhesive which is used here is applied in a cold state. In the hot roller mill and thus in a separate second rolling gap the melting of the hotmelt adhesive and the finishing of the laminate takes place.

Accordingly, at the pre-known method the required sheet must be produced as laminate in two single production processes.

The breathable film has a certain minimum thickness at the production of the same—due to the cast film and blow film process respectively—because otherwise it cannot be wound and be guided through the line respectively without appropriate support by arrangement on the carrier material. At a subsequent laminating with the carrier material the film is again unrolled and processed (laminated) on a laminating device. Thus up to now the mentioned products are produced in such a manner that a sheet is laminated with a finished film by means of adhesive lamination.

By this two-step process additional production steps and consequently corresponding cost result. It is also detrimental that it is not possible to produce a very thin breathable functional layer because this must have a certain minimum thickness for the handling at the pre-known method. The thickness of the functional layer is decisive for the breathability of the whole composite, i.e. the thinner the layer the higher the breathability.

SUMMARY OF THE INVENTION

It is an object of the invention to create a method of the kind mentioned above as well as a corresponding device by which it is possible to avoid the above mentioned drawbacks. Accordingly a water vapor permeable laminar sheet should be created in economical manner which is characterized by a thin layer of the water vapor permeable material. Furthermore, an improved connection should be produced between the carrier sheet and water vapor permeable material. Thereby, the method should allow an efficient production of the sheet.

The solution of this object by the invention is characterized in that the method comprises the steps of:

a) Feeding of a laminar carrier sheet to a first roll and application of an adhesive onto one side of the side of the carrier sheet at a first location in conveying direction of the carrier sheet, wherein the adhesive is a hot melt adhesive and is applied onto the carrier sheet in a molten state;

b) Application of a water vapor permeable molten material onto that side of the carrier sheet which is provided with the adhesive at a second location in conveying direction of the carrier sheet which is located downstream from the first location;

c) Pressing of the composite of carrier sheet, adhesive and water vapor permeable material in a rolling gap which is formed by the first roll and a second roll which cooperates with the first roll;

d) Cooling of the pressed composite of carrier sheet, adhesive and water vapor permeable material in conveying direction downstream the rolling gap and hauling of the composite from the roll arrangement.

A beneficial design of the method provides that a further laminar designed material in form of an open grid is brought between the adhesive and the water vapor permeable material. By such an open grid the strength properties of the laminate which is to be produced can be improved.

The water vapor permeable material is preferably melted by means of an extrusion process.

The water vapor permeable material is for example and preferably thermoplastic elastomer (TPE), thermoplastic copolyester (TPC), thermoplastic urethane (TPU) or thermoplastic copolyamide (TPA).

As carrier sheet a foil, a textile fabric or a non-woven fabric can be employed.

The adhesive is thereby preferably applied by means of a sheet die onto the carrier sheet. However, the water vapor permeable material is preferably by means of a flat die onto the carrier sheet.

The adhesive is thereby preferably applied onto the carrier sheet in such a manner that an open-cell layer of adhesive without a total continuous laminar coating is given on the carrier sheet.

The cooling according above mentioned step d) takes thereby preferably place by cooling of the second roll.

The device for carrying out the method is characterized according to the invention in that it comprises:

a first roll, wherein at a first peripheral location of the first roll or in conveying direction (shortly) upstream of the first contact between the first roll and carrier sheet a sheet die or flat die is arranged for the application of molten adhesive in the form of a hotmelt adhesive in molten state, a second roll, which cooperates with the first roll by forming of a rolling gap, a flat die for the application of water vapor permeable material which is arranged in the region of the rolling gap.

Thereby, it is preferably provided that the first peripheral location of the first roll and the rolling gap are distanced from another by a peripheral angle of at least 120°, preferably 180°.

Furthermore an application system for an adhesive can be provided for the application of a layer of adhesive onto the carrier sheet.

Thus, the invention provides that the two different method steps and application methods respectively, which up to now have been separated in the state of the art, are combined in one process.

By doing so a laminated breathable, i.e. water vapor permeable laminar product can be produced in a cost-efficient manner.

It is furthermore beneficial that materials can be connected with another by the use of an adhesive which apart from that show no or only a bad bond.

The carrier material, preferably in the form of a foil, of a textile fabric or of a non-woven material, is connected with an extruded molten layer by means of a hotmelt adhesive.

Thus, the proposed method works in two steps. The sheet of carrier material is here coated with a "ripped" hotmelt adhesive preferably by means of a sheet die and is subsequently coated in the following coating gap with an extruded breathable molten film preferably by means of a flat die. The breathable molten film is preferably not yet cooled down when reaching the sheet which is pre-coated with the hotmelt adhesive.

By the combined operation mode the breathable molten film can be produced thinner because it is immediately applied onto the sheet and thus no restrictions exist concerning the guidance of the sheet. Due to the fact that the molten film is not yet cooled down at the application but exists in the molten state it adheres better to the carrier sheet which has to be coated.

Furthermore it is beneficial that a thinner functional layer can be produced due to the direct coating with molten film.

By the combination of the two processes the production costs can be reduced.

Thus, overall it can be said that according to the invention it is provided that the process of the production of the whole composite of carrier sheet, water vapor permeable material and hotmelt adhesive takes place in a single process step and a single rolling gap accordingly. Insofar, reference is made to FIG. 1 (see below).

By the proposed method significant benefits in terms of the process technology are obtained: Because the hotmelt adhesive is applied onto the carrier sheet in a molten state—namely shortly before the water vapor permeable material is applied onto the carrier sheet—the hotmelt adhesive has an improved reactivity. The composite between the single components of the resulting sheet is thus improved.

In addition, by the application of the hotmelt adhesive in the molten state a less thickness of the water vapor permeable material layer can be obtained. A value below 12 μm thickness of this layer cannot be reached by pre-known solutions; when using the solution according to the invention this value can be approximately halved.

Furthermore, it is essential that the whole process can be carried out in a single rolling gap so that not only the requirements with respect to the device are reduced but also an improved connection of the obtained sheet is given.

With the described method and the respective device different products can be manufactured which have been proven particularly beneficial for special applications. Some examples for that are named below.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 2 shows the detail "X" according to FIG. 1, FIG. 3 shows the detail "X" according to an alternative embodiment and FIG. 4 shows preferred applications as well as special operation modes according to the concept of the invention.

DETAILED DESCRIPTION OF THE INVENTION

Figure 1:
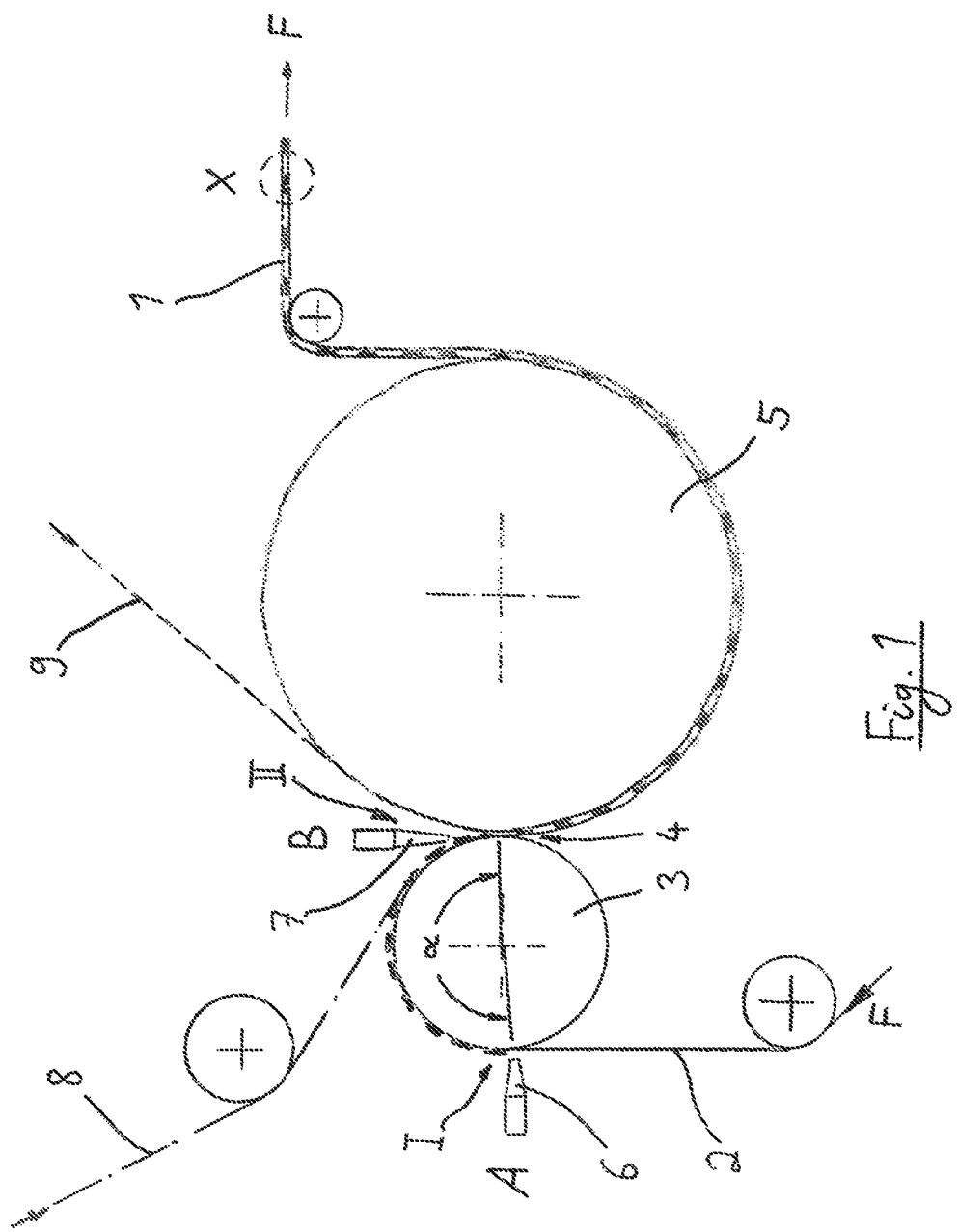
FIG. 1 shows the side view of a device for the production of a water vapor permeable laminar sheet.

In the figures a water vapor permeable laminar sheet 1 can be seen which is produced with the device which is shown in FIG. 1. The sheet 1 consists of a laminar carrier sheet 2 which can be a foil or which consists of a non-woven material. The carrier sheet 2 is conveyed to a first roll 3 in a conveying direction F. The carrier sheet 2 is guided around the first roll 3 by a peripheral angle of about 180° before it reaches a rolling gap 4 which is formed by a first roll 3 and a second roll 5.

In the depicted embodiment according to FIG. 1 it can also be seen—what however is only optional and not mandatory—that an open grid 8 is guided into the region of the rolling gap 4 which is integrated into the emerging laminated composite.

As soon as the carrier sheet 2 reaches the first roll 3 (it is however also possible that this takes place earlier, seen in conveying direction F) a molten adhesive A (hotmelt adhesive) is applied onto the carrier sheet 2 at a first location I by means of a sheet die 6. However this application does not take place area-wide; rather the adhesive A leaves uncovered a part of the surface of the carrier sheet 2 what is indicated in the figures.

A flat die 7 is arranged in the region of the rolling gap 4 by which a water vapor permeable material B in the molten state can be applied onto the carrier sheet 2, namely onto that side on which also the adhesive A was applied. Thereby, the flat die 7 is arranged at a second location II which is distanced from the first location I along the peripheral angle ☐ of about 180°.

Thus, according to a preferred embodiment of the invention the carrier sheet (ware sheet) 2 is coated with the adhesive layer A by means of the sheet die 6 which is arranged in the entry of the laminator (roller frame with cooling roll 5 and rubberized nip roll 3). This adhesive layer A does not cover the carrier sheet 2 continuously but forms an open cell coating.

Subsequently, an extruded melt film is applied by the flat die 7 and is pressed in the rolling gap (laminating gap) 4 between cooling roll 5 and rubberized nip roll 3. The extruded material is of a breathable type which allows diffusion of water vapor.

In FIG. 2 the completed laminate is shown which consists here of the laminar carrier sheet 2, the adhesive A and the water vapor permeable material B.

In distinction to that, FIG. 3 shows the composite which here furthermore comprises the open grid 8 which is arranged between the adhesive A and the water vapor permeable material B. By the grid 8 the mechanical stability of the laminate is improved.

In FIG. 4 it is shown by means of a matrix how for different products (products number 1 till 21 downwards) the sequence of the process (from the left side to the right side) and the used materials can be designed.

Four blocks of product groups are shown one below the other, namely the product groups 1, 2, 3 and 4.

The product group 1 can be for example roof underlays, the product group 2 can be medical applications (especially surgery kerchiefs, surgery coverings and surgery underlays), the product group 3 can be single-use garments, foils for napkins, backsheets and sanitary foils and the product group 4 can be functional garments.

The product group 1 comprises the products 1 till 11, the product group 2 comprises the products 12 till 17, the product group 3 comprises the products 18 and 19 and product group 4 comprises the products 20 and 21.

In FIG. 4 the operated process steps are shown for the single products 1 till 21 from the left side to the right side, wherein with bold text that material is denoted which comes from an unwind and is guided to the process. With underlined text that material is denoted which is applied by means of a hotmelt nozzle, i.e. in the meaning of the above description by means of the sheet die 6. With italic text that material is denoted which is applied by means of an extrusion nozzle, i.e. in the meaning of the above description by means of the flat die 7.

That material which is denoted "nonwoven" is especially a non-woven fabric and fleece respectively which is guided into the process as a sheet. As can be seen from FIG. 4 also a felt can be employed; also a textile fabric is possible.

Then, on said sheet adhesive and hot-melt adhesive ("hotmelt") respectively is applied by means of the die 6 in most of the shown cases. In some cases prior to that a reinforcement grid 8 can be applied as described above.

Subsequently, the application of material by means of the die 7 occurs by extrusion. As can be seen by the different possibilities according to FIG. 4 especially thermoplastic elastomer (TPE) or thermoplastic polyurethane (TPU) can be provided which is applied by said process; also the combination of both process steps (which follow subsequently) is possible, see products 9 and 10.

Subsequently further process steps are possible according to which again hot-melt adhesive ("hotmelt") is applied as well—following to that—then a further material sheet ("nonwoven" or textile fabric) is led in and is connected with the sheet composite. Insofar reference is made to FIG. 1 where can be seen as a possible exemplary embodiment that an additional substrate 9 is led in the process at a desired location to produce the desired composite of sheets and thus to obtain the water vapor permeable laminar sheet 1. Said substrate 9 is thus led in to the process region from an additional unwind.

Thereby, the nonwoven material has mostly a weight from 30 to 140 g/m$^2$; the same applies for the felt. The textile fabric has mostly a weight from 10 to 60 g/m$^2$.

The hotmelt adhesive is applied with a weight from about 1 to 10 g/m$^2$ (in case of the product groups 3 and 4 it is mostly a bit less: 1 to 6 g/m$^2$). The reinforcement grid has mostly a weight from 5 to 35 g/m$^2$.

The extruded material is applied in the case of TPE mostly with a weight from 10 to 40 g/m$^2$, in the case of TPU mostly with a weight from 10 to 80 g/m$^2$. At the above mentioned product groups 2, 3 and 4 it can be 6 to 40 g/m$^2$ in the case of TPE and TPU.

The described above embodiments and layer compositions have to be understood as examples. The most different combinations of carrier materials, adhesives and water vapor permeable materials are possible. The man skilled in the art will determine the combinations of the mentioned elements and components respectively for the specific application.

While specific embodiments of the invention have been shown and described in detail to illustrate the inventive principles, it will be understood that the invention may be embodied otherwise without departing from such principles.

We claim:

1. A method for the production of a water vapor permeable laminar sheet, wherein the method comprises the steps of:
    a) feeding a laminar carrier sheet to a first roll of a roll arrangement including the first roll and a second roll in a first conveying direction, and applying an adhesive onto one side of the carrier sheet at a first location in the conveying direction of the carrier sheet, wherein the adhesive is a hot melt adhesive and is applied onto the carrier sheet in a molten state by a sheet die, wherein the adhesive is applied onto the carrier sheet with interruptions so that a part of the one side of the carrier sheet is not covered by the adhesive;
    b) applying a water vapor permeable molten material onto that side of the carrier sheet which is provided with the adhesive at a second location in the conveying direction of the carrier sheet which is located downstream from the first location, wherein the first location at which the adhesive is applied to the carrier sheet and the second location at which the water vapor permeable molten material is applied onto the carrier sheet are two locations on a circumference of the first roll, which are distanced from each other by a peripheral angle of at least 120°;
    c) pressing the composite of the carrier sheet, the adhesive, and the water vapor permeable material in a rolling gap which is formed by the first roll and the second roll which cooperates with the first roll;
    d) cooling the pressed composite of the carrier sheet, the adhesive, and the water vapor permeable material in the conveying direction downstream of the rolling gap, and hauling of the composite from the roll arrangement.

2. The method according to claim 1, wherein a further laminar designed material in a form of an open grid is brought between the adhesive and the water vapor permeable material.

3. The method according to claim 1, wherein the water vapor permeable material is melted by an extrusion process.

4. The method according to claim 1, wherein the carrier sheet is a foil, a textile fabric, or a non-woven fabric.

5. The method according to claim 1, wherein the water vapor permeable material is applied by a flat die onto the carrier sheet.

6. The method according to claim 1, wherein the cooling according to step d) takes place by cooling of the second roll.

* * * * *